United States Patent [19]

Argurio et al.

[11] 3,985,833

[45] Oct. 12, 1976

[54] SELF-SEALING FILMS COMPRISING A POLYOLEFIN AND A PARTIAL ESTER OF A CARBOXYLIC ACID AND A POLYOL

[75] Inventors: Federico Argurio, Brussels; Mario Borsatti, Overijse; Jan Heindrijckx, Berg, all of Belgium

[73] Assignee: Exxon Research and Engineering Company, Linden, N.J.

[22] Filed: June 11, 1975

[21] Appl. No.: 585,743

[30] Foreign Application Priority Data

July 9, 1974 United Kingdom............... 30353/74

[52] U.S. Cl............................. 260/897 R; 260/829; 260/897 A
[51] Int. Cl.².......................................... C08L 23/06
[58] Field of Search............................. 260/897, 829

[56] References Cited
UNITED STATES PATENTS 3,794,698 2/1974 Diaz et al........................ 260/897 R
3,812,207 5/1974 Glaser et al..................... 260/897 A Primary Examiner—Carman J. Seccuro
Attorney, Agent, or Firm—John J. Mahon

[57] ABSTRACT

A composition suitable for fabricating into a self-sealing film comprises:
  i. 85 to 99.8 wt.% of a thermoplastic polyolefin, e.g. polyethylene,
  ii. 0.1 to 10.0 wt.% of a partial ester of a carboxylic acid and a polyol e.g. sorbitan mono laurate, sorbitan monostearate or sorbitan monobehenate and
  iii. either 0.1 to 10 wt.% of hydrogenated hydrocarbon resin or 0.1 to 10 wt.% of polybutene or polyisobutene, provided the combined weights of (ii) and (iii) is not more than 15 wt.%.

The film may be made by tubular blowing.

18 Claims, No Drawings

SELF-SEALING FILMS COMPRISING A POLYOLEFIN AND A PARTIAL ESTER OF A CARBOXYLIC ACID AND A POLYOL

This invention relates to self-sealing packaging films.

Self-sealing packages films are known and are used in shops for example, for wrapping and display of food in refrigerated display units.

Various materials have been used for such films, the most common being PVC and polyolefin. However these films suffer from various disadvantages and have not been completely satisfactory in use.

We have now discovered a composition which when made into film has good antifog properties, good permeability to oxygen and good tack. The film also has relatively low cost compared with other films. According to this invention a composition suitable for fabricating into a self sealing film comprises (i) 85 to 99.8 wt.% of a thermoplastic polyolefin, (ii) 0.1 to 10.0 wt.% of a partial ester of a carboxylic acid and a polyol, and (iii) 0.1 to 10 wt.% of a hydrogenated hydrocarbon resin, polybutene or polyisobutylene or a mixture thereof, provided the combined weights of (ii) and (iii) is not more than 15 wt.%. Preferably the combined weights of (ii) and (iii) is not more than 10 wt.%.

The thermoplastic polyolefin should preferably have a melt index (as defined in ISO.R292) of 0.2 to 20; preferably 0.5 to 10.

The thermoplastic polyolefin which can be used in conjunction with the copolymer is preferably a homopolymer of ethylene but it can be a homopolymer of other olefins e.g. propylene, butylene, or it can be a copolymer, e.g. a copolymer of ethylene and propylene.

Examples of suitable polyolefins include low density (preferably 0.920 to 0.924 e.g. 0.922) polyethylene which is usually prepared by polymerizing ethylene at high pressure, e.g. 30 to 2,500 atmospheres, in the presence of a polymerization catalyst, e.g. an organic peroxide such a lauroyl peroxide. Also suitable is low pressure high density polyethylene which usually has a density of 0.94 to 0.96, and a molecular weight of from 30,000 to 500,000 as determined by the intrinsic viscosity method. This low pressure polyethylene can be made by well-known polymerization methods using a Zieger catalyst (e.g. $AlCl_3$ and $TiCl_4$). Another suitable polyolefin is low pressure isotactic propylene polymer which usually has a density of from 0.86 to 0.91, and a molecular weight of from 50,000 to 500,000 as determined by the intrinsic viscosity method. It is made by similar methods to those used for making low pressure polyethylene. Also suitable are medium density polyethylene (0.926 to 0.940, e.g. about 0.934) and thermoplastic copolymers with partially crystalline heteroblocks of propylene with ethylene and/or butene with a density of from 0.896 to 0.899.

The preferred amount of thermoplastic polyolefin is 97 to 99 wt.%, e.g. about 98.0 wt.%.

The second component of the film-forming composition of this invention is a partial ester of a carboxylic acid and a polyol, by which term we mean that there is at least one free hydroxyl group remaining unesterified, this hydroxyl group being derived originally from the polyol. The carboxylic acid can be saturated or unsaturated carboxylic acid and the preferred acids have 10 to 24 carbon atoms per molecule. Preferably the carboxylic acid is a (monobasic) fatty acid and suitable acids include the saturated acids, lauric ($C_{12}$), myristic ($C_{14}$), palmitic ($C_{16}$), stearic ($C_{18}$) or behenic ($C_{22}$) or the unsaturated acids oleic ($C_{18}$) or erucic ($C_{22}$). If desired however one could use a dicarboxylic acid, e.g. adipic or pimelic acids.

The polyol may have two hydroxyl groups per molecule, e.g. ethylene glycol, propylene glycol or butylene glycol; three hydroxyl groups per molecule, e.g. glycerol or trimethylolpropane or four hydroxyl groups per molecule, e.g. pentaerythritol. Further examples are sorbitol 6 hydroxyl groups), sorbitan (sorbitol anhydride - 4 hydroxyl groups) and dipentaerythritol (6 hydroxyl groups).

Since the ester must be a partial ester at least one of the hydroxyl groups must be a un-esterified, and usually only one of the hydroxyl groups is esterified. Thus, preferred esters are mono esters of sorbitol or sorbitan, e.g. sorbitan monolaurate, sorbitan monostearate sorbitan monobehenate, but one could use for example glyceryl mono oleate.

The preferred amount of partial ester is 1 to 3 wt.%, e.g. about 1.5 wt.%.

The third component which improves the tack is a hydrogenated hydrocarbon resin, polybutene or polyisobutylene or a mixture thereof.

The hydrocarbon resin is an amorphous hydrocarbon polymer having a number average molecular weight of not more than 3,000, usually 500 to 2,500, Usually the resin is polycyclic. Thus the resin may be a resin obtained by the polymerization of a cracked petroleum distillate fraction. The polymer is then hydrogenated to yield a very light coloured product.

Although various petroleum distillate fractions may be used the preferred feed-stocks are those having a relatively wide boiling range, e.g. 20° C to 280° C.

Before polymerization takes place the cracked petroleum distillate fraction is preferably heat-soaked, e.g. at a temperature above 100° C e.g. 130° C to 140° C, for a period of less than one hour so as to dimerize the cyclic dienes. The heat-soaked feed is thereafter distilled and the desired fraction e.g. one boiling between 80° C and 180° C, vacuum distilled to obtain the desired cut to be polymerised.

The preferred fractions are those which comprise compounds having one or more unsaturated rings in the molecule, such as cyclodienes, cycloalkenes, indenes etc., in particular the fractions boiling above 100° C.

Polymerization preferably takes place without a catalyst, i.e. thermal polymerization at a preferred temperature of 240° C to 320° C, e.g. about 250° C. The thermal polymerization is preferably carried out in an inert atmosphere, e.g. $N_2$ at a pressure of 10–12 atmospheres for 1 to 9 hours. If desired polymerization can take place using a Friedel-Crafts catalyst, such as $AlCl_3$, $BF_3$, $SnCl_4$, $TiCl_4$ at a temperature of $-100°$ C to $+95°$ C, e.g. 0° C to 55° C.

When subjecting the polymer to hydrogenation, the polymer is first preferably dissolved in a saturated hydrocarbon solvent such as heptane, in a proportion of for example 20 to 60% by weight in relation to the polymer solution.

Suitable hydrogenation catalysts include nickel, reduced nickel, nickel-tungstensulphide, molybdenum sulphide, and a preferred catalyst is a pre-activated catalyst on a Kieselguhr support containing about 58% by weight of nickel, the specific area being about 140 $m^2/g$ and the ratio: reduced nickel/total nickel being about 0.66. Suitable proportions of catalyst are from 5 to 20% by weight, e.g. 7 to 13 by weight, based on weight of resin.

Hydrogenation preferably takes place at 215° to 270° C e.g. about 215° C at a pressure of 40 to 60 atmospheres, e.g. 45 atmospheres, for a period up to 3 hours, e.g. about 2 hours.

After cooling the solution of polymer should be filtered to eliminate traces of catalyst and obtain a clear solution free from all impurities.

The solution is then distilled under nitrogen and thereafter steam distilled at a temperature not exceeding 260° C.

The resin thus obtained usually has a Gardner colour of 1 to 3, a bromine number of 1 to 20 and a ball-ring softening point of about 100° C.

A preferred resin derived from a petroleum distillate fraction is a hydrogenated polycyclopentadiene resin. Suitable hydrocarbon resins also include polyterpene resins or hydrogenated coumarone-indene resins.

Suitable polyisobutylenes (e.g. Vistanex) are highly paraffinic hydrocarbon polymeric compositions with long straight molecules having terminal unsaturation only. They are relatively low molecular weight, very viscous, clear tacky and semi-solids.

The polyisobutylene which may be used is preferably of relatively low molecular weight, e.g. of Staudinger viscosity average molecular weight from 6,000 to 12,000, e.g. 8,700 to 10,000 and a viscosity average MW (Flory) of 20,000 to 60,000 e.g. about 35,000. The polyisobutylene may be a homopolymer or may contain small amounts of other copolymerised monomers such as styrene.

The preferred amount of hydrogenated hydrocarbon resin, polybutene, and/or polyisobutylene is from 0.1 to 3.0 wt.%.

After mixing the constituents of the composition of the invention the desired stretch and seal film can be made either by tubular blowing or by chill roll casting. In the tubular blowing method the composition in the molten state is forced around a mandrel inside a die and extruded at a temperature of between 150° C and 250° C through the die opening as a tube. The tube whilst still in the melt state is expanded to a hollow cylinder of desired diameter by blowing with air admitted through the centre of the mandrel. As an alternative to cooling with air the extruded film can be cooled by a water bath system in which the extruded film (tubular or flat) is cooled by passing through a water bath containing flowing water. In the chill roll casting method the hot melt extruded through a die slot is cooled by the surface of two or more water-cooled chill rolls. The chill roll casting method and the water bath system result in a more tacky, more elastic film with better visual appearance.

The thickness of the film is typically from 8 to 30 micron, preferably 10 to 25 microns, e.g. 12 to 20 micron.

The films produced from the composition of this invention have the following advantages:

optimum tack resulting in both self adhesion and easiness in film handling and machinability whereby the efficiency of the packaging operation is increased;

optimum antifog properties whereby the packaged product can be clearly seen in the display unit since no layer of opaque fine droplets is formed when the production is placed in a refrigerator;

good permeability to oxygen whereby the quality of any food which is packaged is preserved; and roll wind-off whereby during use or further processing operations, such as slitting and re-winding of large rolls, the film can be unwound easily from the roll.

EXAMPLE 98.5 wt.% of an ethylene homopolymer having a number average MW of about 20,000 and a density of 0.922, 1.0 wt.% of sorbitan monolaurate and 0.5 wt.% polyisobutylene were mixed together and extruded by the tubular blowing method — melt temperature 235° C. A blown film of 15 micron thickness was obtained.

The properties of this film were compared with 3 other low density polyethylene films already commercially available, with the following results:

| Film | Tack | Anti-fog | Wind off | Machinability |
| --- | --- | --- | --- | --- |
| Present Invention | Excellent | Excellent | Excellent | Excellent |
| A | Excellent | Poor | Good | Good |
| B | Excellent | Poor | Fair | Poor |
| C | Excellent | Good | Poor | Fair |

Film A was a film of 15 microns thickness made from a blend containing 96.65 wt.% ethylene-vinyl acetate copolymer having a 5 wt.% vinyl acetate content, 3.00 wt.% of a petroleum resin and 0.35 wt.% sorbitan monolaurate.

Film B was a commercial PVC film of 15 microns thickness.

Film C was a film of 15 microns thickness made from a blend containing 97.0 wt.% of ethylene-vinyl acetate copolymer having a 7.0 wt.% vinyl acetate content and 3.0 wt.% glyceryl monooleate.

Thus, it can be seen that films made from the composition of this invention show decided advantages over other films.

What is claimed is:

1. A composition suitable for fabricating into a self-sealing film comprising:
   i. 85 to 99.8 wt.% of a thermoplastic polyolefin,
   ii. 0.1 to 10.0 wt.% of a partial ester of a carboxylic acid having 10 to 24 carbon atoms and a polyol and
   iii. either 0.1 to 10 wt.% of hydrogenated amorphous hydrocarbon resin selected from the group consisting of hydrogenated polyterpene resins, hydrogenated coumaroneindene resins and hydrogenated resins derived from a petroleum distillate fraction or 0.1 to 10 wt.% of polybutene or polyisobutene, provided the combined weights of (ii) and (iii) is not more than 15 wt.%.

2. A composition according to claim 1 wherein the themoplastic polyolefin has a melt index (as defined in ISO R292) of 0.2 to 20.

3. A composition according to claim 2 wherein the themoplastic polyolefin is an ethylene homopolymer.

4. A composition according to claim 3 wherein the ethylene homopolymer is low density polyethylene of density 0.920 to 0.924 prepared by polymerizing ethylene at a pressure of 30 to 2,500 atmospheres in the presence of a polymerization catalyst.

5. A composition according to claim 3 wherein the ethylene homopolymer is a medium density polyethylene having a density of 0.926 to 0.940.

6. A composition according to claim 3 wherein the amount of thermoplastic polyolefin is 97 to 99 wt.%.

7. A composition according to claim 3 wherein the partial ester is an ester of a fatty acid.

8. A composition according to claim 3 wherein the partial ester is a mono ester of sorbitol or sorbitan.

9. A composition according to claim 1 wherein the partial ester is sorbitan mono laurate, sorbitan monostearate or sorbitan monobehenate.

10. A composition according to claim 3 wherein the amount of partial ester is 1 to 3 wt.%.

11. A composition according to claim 1 wherein the hydrocarbon resin is a hydrogenated resin obtained by the polymerization of a cracked petroleum distillate fraction.

12. A composition according to claim 11 wherein said fraction is one comprising compounds having one or more unsaturated rings in the molecule.

13. A composition according to claim 12 wherein the fraction boils over 100° C.

14. A composition according to claim 3 wherein the hydrogenated hydrocarbon resin is hydrogenated polycyclopentadiene resin.

15. A composition according to claim 1 wherein component (iii) is polyisobutene of Staudinger viscosity average molecular weight of from 6,000 to 12,000 and a viscosity average MW (Flory) of about 20,000 to 60,000.

16. A composition according to claim 1 wherein the amount of component (iii) is 0.1 to 3.0 wt.%.

17. A composition according to claim 1 wherein the combined weights of (ii) and (iii) is not more than 10 wt.%.

18. A self sealing film made by tubular blowing from the composition according to claim 1.

* * * * *